Feb. 4, 1947.   I. I. SIKORSKY   2,415,148
BLADE FLAPPING ANGLE CONTROL
Filed Dec. 28, 1942   2 Sheets-Sheet 1

INVENTOR
*Igor I. Sikorsky.*
BY *Harris G. Luther*
ATTORNEY

Feb. 4, 1947.      I. I. SIKORSKY      2,415,148
BLADE FLAPPING ANGLE CONTROL
Filed Dec. 28, 1942      2 Sheets-Sheet 2
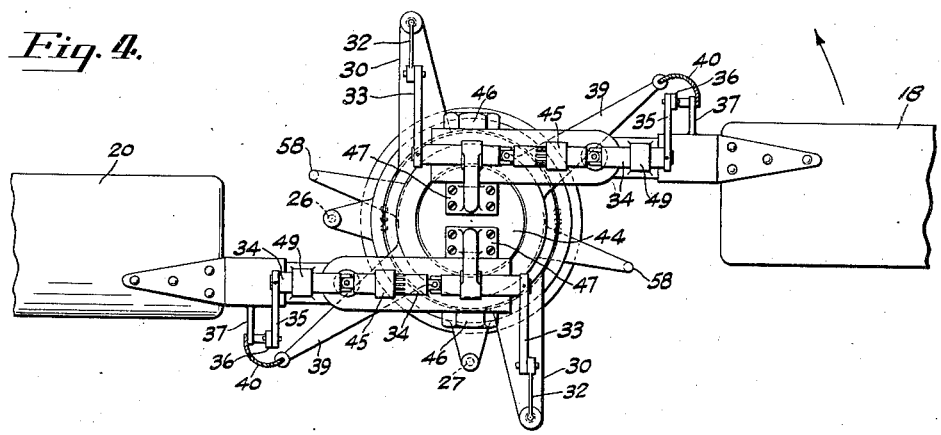
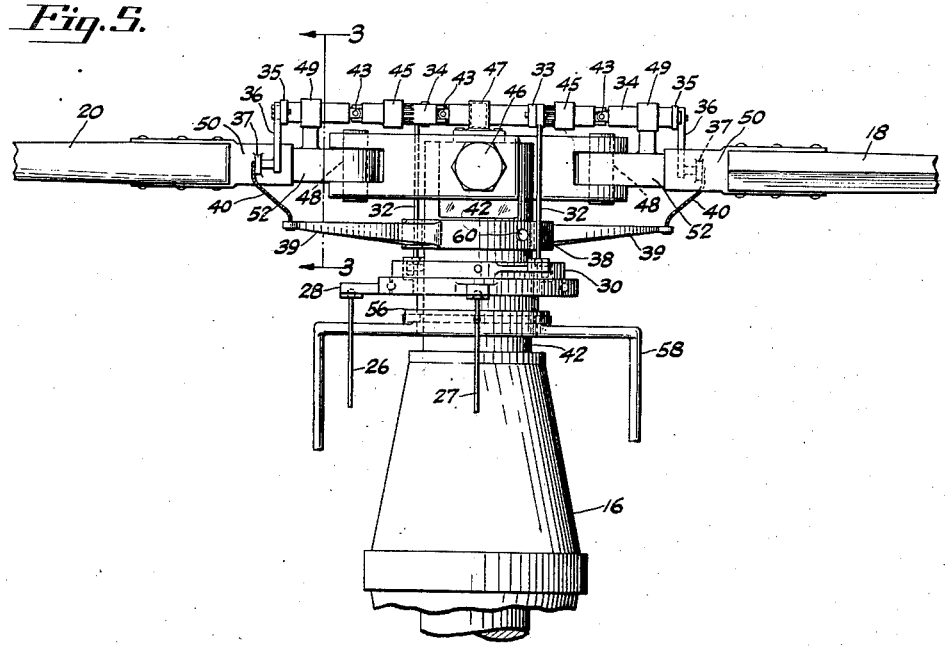
INVENTOR
*Igor I. Sikorsky.*
BY *Harris G. Luther*
ATTORNEY Patented Feb. 4, 1947

2,415,148

UNITED STATES PATENT OFFICE 2,415,148

BLADE FLAPPING ANGLE CONTROL

Igor I. Sikorsky, Bridgeport, Conn., assignor to United Aircraft Corporation, East Hartford, Conn., a corporation of Delaware Application December 28, 1942, Serial No. 470,336

6 Claims. (Cl. 244—17)

This invention relates to a direct lift aircraft having a power driven rotor, or rotors.

An object of this invention is to provide a device for automatically reducing the pitch of the rotor blades at coning angles above a selected angle.

Other objects and advantages will be apparent from the specification and claims, and from the accompanying drawing which illustrates what is now considered to be a preferred embodiment of the invention.

In the drawings, Fig. 1 is a schematic view showing a direct lift aircraft having a rotor provided with the automatic pitch reducing device of my invention.

Figs. 4 and 5 are top and front views, respectively, showing details of one form of manual rotor pitch control mechanism and including one form of automatic pitch reducing device.

Figure 1:
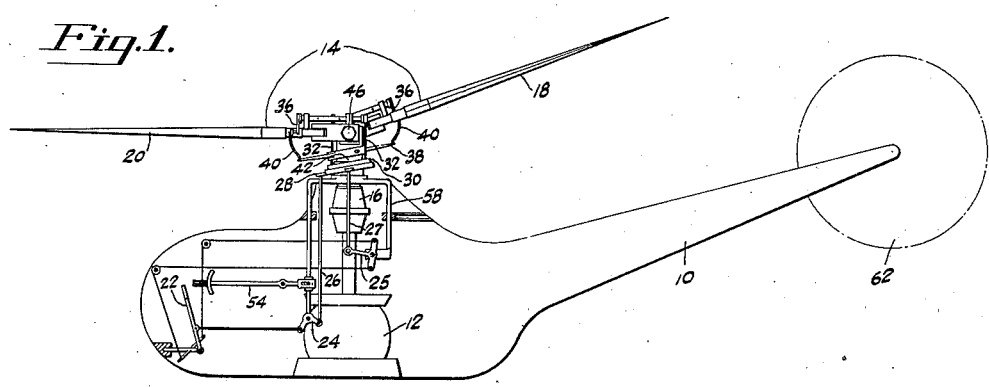

In rotary wing aircraft utilizing a power driven rotor in which provision is made for autorotation, the pitch of the rotor blades must be reduced when changing from power operation to autorotation. For example, the blade pitch might be varied from about five to fifteen degrees during power operation but the pitch of the same airfoil should be less than about six degrees for autorotation.

According to my invention, means are provided for rapidly reducing the blade pitch upon increase in the coning angle beyond a selected amount thus insuring that the rotor will automatically go into autorotation and effectively prevent a dangerous increase in coning of the blades.

In the device disclosed in the drawings, aircraft 10 is provided with engine 12 driving rotor 14 through a transmission 16. A clutch such as a one-way clutch or free wheeling device (not shown) may be used to disconnect the engine from the rotor to permit autorotation without rotation of the engine. The rear torque compensating propeller 62 will, however, ordinarily remain connected with the main rotor to be rotated thereby. The rotor may be either two bladed, as shown, or of any other number of blades, each mounted about a "flap" pivot 46 (Figs. 4 and 5) and a "drag" pivot 48 for universal movement with respect to head 44 on rotor drive shaft 42.

During rotation, centrifugal forces acting on each blade tend to force it outwardly, in a plane normal to the axis of rotation thereof, while aerodynamic lift forces on each blade tend to force it upwardly about the pivot 46 toward the axis of rotation. The resultant force, and blade direction, will lie along some intermediate line, oblique to the axis of rotation. Thus, as the blade rotates it will describe a generally cone-shaped figure whose apex lies on the axis of rotation and whose base is a plane determined by the path of the tip of each blade. The angle between the plane of the base of this cone and the sides thereof is called the coning angle, and may also be defined (see N. A. C. A. Report No. 474, 1933) as the average angle between the span axis of a blade or wing of a rotary wing system and a plane perpendicular to the axis of rotation. For the purpose of this specification it will be more convenient to consider instantaneous angles. The coning angle thus would be the algebraic average of the instantaneous angles between the longitudinal or span axis of each blade and a plane normal to the axis of rotation of said rotor. This angle will vary as a function of the lift on the blades and the centrifugal force, which in turn are functions of the pitch and speed of rotation of the blades. The greater the pitch the larger will be the coning angle at a given rotative speed and the greater the speed of rotation the less will be the coning angle for a given pitch. In power driven flight the coning angle, as well as the inclination of the cone axis with respect to the axis of rotation, changes within certain definite limits.

The pitch of rotor blades 18, 20 may be altered by rotating blade shanks 50 about drag links 52 by moving control stick 22 which acts through levers 24, 25 and rods 26, 27 to tilt a non-rotatable pitch changing collar 28. Other means such as lever 54 and the frame 58 (which carries the fulcrums of levers 24, 25) may be provided for bodily reciprocating collar 28 without affecting the "tilt" thereof to simultaneously increase or decrease the pitch of all the blades. Movements of collar 28 are transmitted by a swivel connection to an upper collar 30, which is mounted on gimbals on a sleeve 56 free to slide on shaft 42 but constrained to rotate with the shaft and the blades. This movement of collar 28 is then transmitted by levers 32, 33, articulated shafts 34, and levers 35 and 37, and links 36 to blades 18 and 20. Shafts 34 are provided with universal joints 43 and extensible joints 45 for accommodating movement of the rotor blades so that the blade pitch will be substantially unaffected by movement of the blades. The shafts are journalled at one end in brackets 47 fixed to head 44 and at the other end to brackets 49 fixed to drag links 52.

Lever 54 is connected to a reciprocable frame 58 carrying levers 24, 25 and having a swivel connection with rotating sleeve 56 so that movement of the lever 54 will simultaneously and equally move all three supports of the collar 28, that is the two supports by rods 26, 27 and a third support represented by the intersection of the gimbal axes of the collar 30, and thus bodily move the collar. If necessary, friction means may be provided to hold the lever in position against undesired movement.

The mechanism described above is effective for manually changing the blade pitch. Means for automatically changing the blades into low pitch upon excessive coning thereof is also provided, and is superimposed upon the manual control. This comprises a ring 38 pivoted to rotor driving shaft 42 on an axis 60 transverse to the blades (or mounted on gimbals, as where more than two rotor blades are provided) and connected to the blade pitch changing lever arm 37 by extensions 39 and cables 40.

Figure 2:
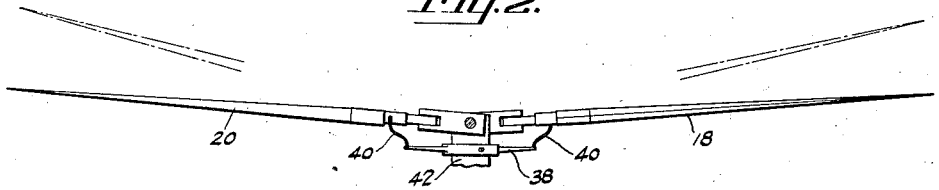
Figs. 2 and 3 are schematic views of the rotor and pitch reducing device per se.
Figure 3:
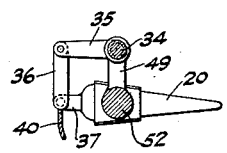

As best shown in Figs. 1 and 2, this ring will move about its pivot to accommodate tilting movements of the cone of the blades about the axis of rotation, as where at any particular instant one blade makes a different angle with the axis of rotation than does the other, and the cables 40 will be slack and, therefore, have no effect on the blade pitch for blade coning angles below a predetermined maximum. For greater coning angles, in any tilted position of the cone with respect to the axis of rotation, the cables 40 (which might also be a lever arrangement) will tighten and stop upward movement of the part of lever 37 to which the cable is attached and by exerting a pull on lever 37 act to decrease the pitch of each blade in proportion to the increase in coning angle. It will be noted that the distance from the pivot 46 to the lever arm 37 is much greater than the distance between the pitch changing axis of the blade and the point of connection of cable 40 to lever 37, so that a small coning angle change beyond the selected value will cause a large and rapid change in blade pitch. Movement of lever 37 by cable 40 will cause a movement of the entire pitch changing mechanism including lever 54 and the friction producing means of lever 54 will act to hold the blades in their new pitch position. As a decrease in pitch acts to decrease the lift forces on the blade, the lift forces causing increased coning angles are automatically reduced and the blades will tend to go to a position of decreased coning angle. Of course, if the aircraft is to continue flying the lift must remain substantially constant, so the final result of the automatic decrease in blade pitch described above may be to increase the speed of rotation of the rotor, which will increase the centrifugal force on each blade to reduce the blade coning angle.

As mentioned above, the coning angle varies somewhat during power operation. But upon a power failure, it increases abruptly because the speed of rotation of the rotor, and consequently the centrifugal force on the blades, drops off rapidly. If the pilot decreases the pitch sufficiently the rotor will go into auto-rotation at such reduced pitch, and it is unnecessary for my automatic mechanism to act. Otherwise, however, the blades will cone beyond the predetermined position until the blade pitch is automatically reduced by ring 38 and cables 40 to a pitch where they will autorotate, or be rotated by the aerodynamic forces exerted thereon by the relative wind passing over the rotor, for a controlled power-off descent.

It is to be understood that the invention is not limited to the specific embodiment herein illustrated and described, but may be used in other ways without departure from its spirit as defined by the following claims:

1. In an aircraft having a power driven rotor revolving about a generally vertical axis, hinge means for coning movements of a rotor blade in a substantially vertical plane, means for changing the pitch of said blade, and means including a connection capable of transmitting a pitch changing force in one direction and incapable of transmitting said force in the opposite direction operated by blade coning movements beyond a predetermined degree of coning for decreasing the pitch of said blade.

2. In a direct lift aircraft, a power driven rotor having a plurality of blades, means providing for coning movements of said blades in planes substantially parallel to the axis of rotation thereof, a tiltable and reciprocable collar for changing the pitch of said blades, a ring tiltable about said axis but fixed with respect to movements along said axis and positioned below said rotor, and means flexibly connecting said ring with each rotor blade for changing the pitch thereof upon excessive coning movements.

3. In combination in a rotary wing aircraft, a rotor mounted for rotation about a substantially vertical axis and having a plurality of blades hinged for individual flapping movement and coning angle changes and hinged for pitch changing movements, a plate surrounding said axis and connected with each of said blades, means for tilting said plate to change the relative pitches of said blades, and means including means actuated by changes in the coning angle of said blades for moving said plate axially of said axis for simultaneously changing the pitch of all the blades.

4. In combination in a rotary wing aircraft, a rotor mounted for rotation about a substantially vertical axis and having a plurality of blades hinged for individual flapping movement and coning angle changes and hinged for pitch changing movements, a plate surrounding said axis and connected with each of said blades, means for tilting said plate to change the relative pitches of said blades, means for moving said plate axially of said axis for simultaneously changing the pitch of all the blades, and axially immovable means including a second tiltable plate mounted to tilt about said axis and connected with said pitch changing means to transform coning angle changes beyond a predetermined degree into pitch changes.

5. Control means for a plurality of rotor blades mounted upon pivots carried by flapping hinges, including means for simultaneously changing the pitch of all the blades, means for controlling the relative pitch of the several blades, and means actuated by movement of one blade for reducing the pitch of all the blades, whereby the movement of one blade creating an increase in the coning angle of the rotor blades will override the pitch changing means.

6. Control means for a plurality of rotor blades rotatable in a predetermined pattern and universally mounted upon pivots for pitch change and for movement in flapping and lag-lead directions, means for simultaneously changing the pitch of all the blades, means for controlling the relative pitch of the several blades, and means actuated by movement of at least one blade in at least one of said directions for reducing the pitch of all the blades, whereby the movement of at least one blade changing the pattern of the rotor blades will override the pitch changing means.

IGOR I. SIKORSKY.

REFERENCES CITED

The following references are of record in the file of this patent:

UNITED STATES PATENTS

| Number | Name | Date |
|---|---|---|
| 1,986,709 | Breguet, et al | Jan. 1, 1935 |
| 1,994,488 | Sikorsky | Mar. 19, 1935 |
| 2,002,287 | Flettner | May 21, 1935 |
| 2,030,578 | Flettner | Feb. 11, 1936 |
| 1,682,893 | Cierva | Sept. 4, 1928 |
| 1,800,470 | Oehmichen | Apr. 14, 1931 |
| 2,356,692 | Platt | Aug. 22, 1944 |

FOREIGN PATENTS

| Number | Country | Date |
|---|---|---|
| 608,650 | France | Apr. 24, 1926 |